United States Patent
Suzuki

(12) 
(10) Patent No.: US 6,474,547 B1
(45) Date of Patent: Nov. 5, 2002

(54) AUTOMATIC SERVICE EQUIPMENT

(75) Inventor: Kunikazu Suzuki, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/664,004

(22) Filed: Sep. 18, 2000

(30) Foreign Application Priority Data

Nov. 19, 1999 (JP) .......................................... 11-329104

(51) Int. Cl.[7] .................................................. G06F 17/60
(52) U.S. Cl. .......................................... 235/379; 705/43
(58) Field of Search ................................. 235/379, 380; 705/35, 33, 43; 382/114; 902/22; 434/113; 341/22

(56) References Cited

U.S. PATENT DOCUMENTS

| | | | | |
|---|---|---|---|---|
| 5,017,026 A | * | 5/1991 | Takesako et al. ............. 400/24 |
| 5,412,189 A | * | 5/1995 | Cragun ....................... 235/379 |
| 5,557,269 A | * | 9/1996 | Montane ....................... 341/22 |
| 5,739,509 A | * | 4/1998 | Watanabe et al. ........... 235/379 |
| 6,061,666 A | * | 5/2000 | Do et al. ....................... 705/43 |

FOREIGN PATENT DOCUMENTS

JP          9-106319          4/1997

* cited by examiner

Primary Examiner—Karl D. Frech
Assistant Examiner—Lisa M. Caputo
(74) Attorney, Agent, or Firm—Rabin & Berdo, P.C.

(57) ABSTRACT

Automatic service equipment is provided which is capable of providing easy and simple handleability to users with vision impairments in a cost-effective manner. A user with vision impairments can reach a handset by touching a tactile displaying (or information-presentation) section and by tracing a guide extending therefrom. The user can select a targeted operational device by touching the tactile displaying section in accordance with a voice guidance message provided by the handset and can reach a targeted operational device by tracing the guide.

15 Claims, 6 Drawing Sheets

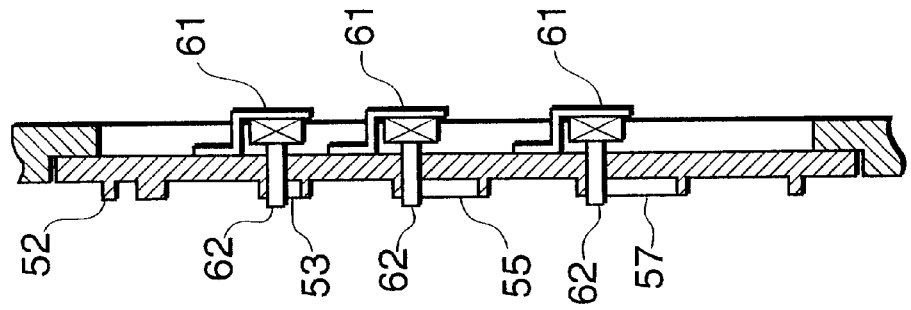
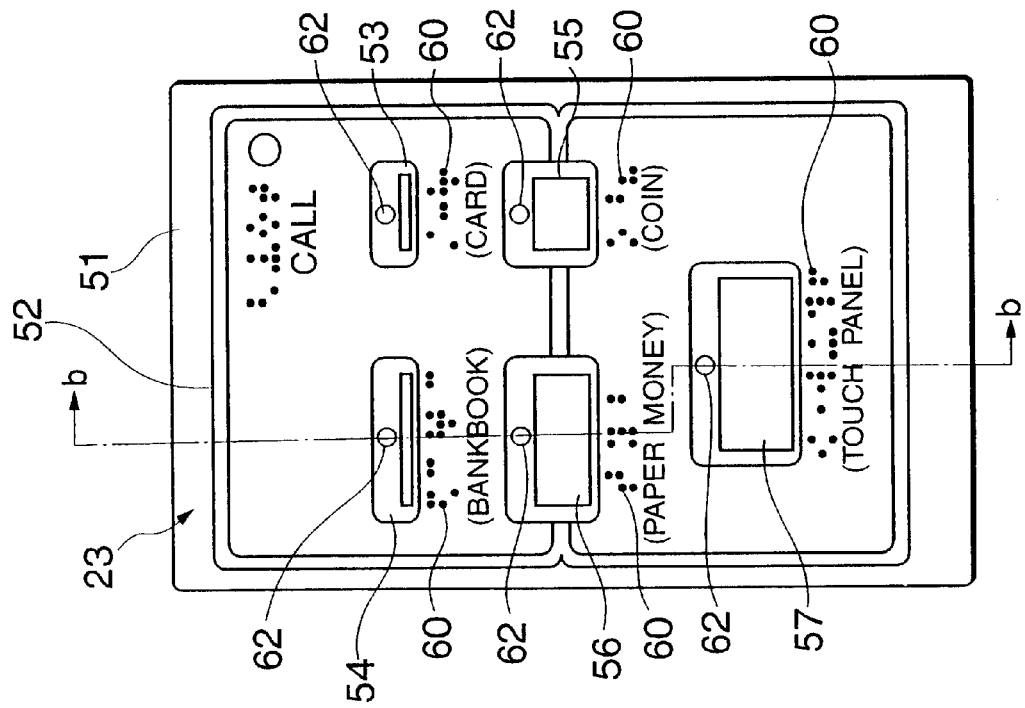

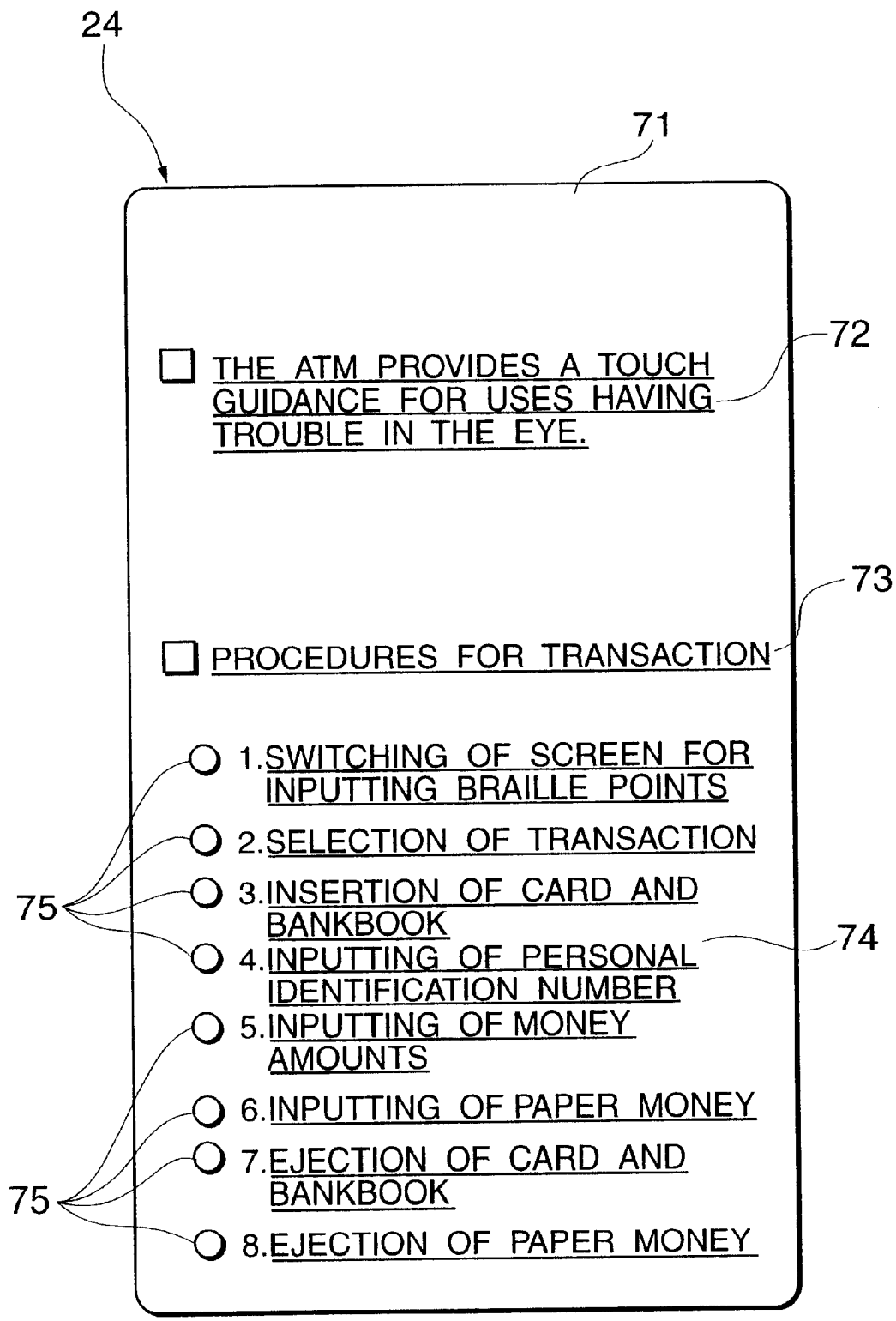

AUTOMATIC SERVICE EQUIPMENT

BACKGROUND OF THE INVENTION

1. Field of the Invention

The present invention relates to automatic service equipment which can be installed at, for example, a bank or a like to provide a specified service to users when operated by the users themselves in the same manner as for an ATM (Automatic Teller Machine) by which transactions are performed through the users' operations. More particularly, the invention is directed to automatic service equipment which can be easily operated by users with vision impairments.

2. Description of the Related Art

In recent years, automatic transaction equipment, such as a cash dispenser, cash depositor or a cash dispensing/depositing machine, has become widespread in financial institutions including banks or the like, and most of the work of depositing or drawing cash is done through the use of the automatic transaction equipment. As such automatic transaction equipment becomes widespread, the use of a Braille portion in the vicinity of a paper money and coin handling port thereof has been proposed to provide operational information in Braille so as to be easily used by a user with vision impairments, including blindness, low vision or the like, for depositing or drawing cash. One example is disclosed in Japanese Patent Application Laid-open No. Hei9-106319 as shown in FIG. 5.

FIG. 5 is a top view of a horizontal portion constituting a front panel which serves as a customer service operation section of conventional automatic transaction equipment adapted to be used by users with vision impairments. In the horizontal portion constituting the front panel serving as the customer service operating section 20 mounted at the front of the machine is provided an operation displaying section 21 having a touch panel and a color liquid crystal display for data input, along left and right portions of which and along a lower portion on which Braille plates 22a, 22b and 22c are mounted.

In the vicinity of the outside of the Braille plate 22a, attached to the left side of the operation displaying section 21, is mounted a guidance section 23 which serves as a collective guidance plate to collectively provide information about relatively positioned layouts of operational devices on the front panel 20, including the paper money handling port and coins handling port, in a manner such that they can be recognized by being touched, i.e., by a tactile sense. Moreover, in the vicinity of the outside portion of the Braille plate 22b attached to the right side of the operation displaying section 21 is mounted another guidance section 24 serving to guide operational procedures so that they can be also recognized by the tactile sense.

FIG. 6A is a top view of the guidance section of the conventional equipment and FIG. 6B is a cross-sectional view of the guidance section of FIG. 6A taken along the line b—b.

On a tactile guidance face 51 of the guidance section 23, i.e., of the collective guidance plate 23, is formed a layout pattern 52 having protrusion portions each showing each of the operational devices. A user with vision impairments can get specified information by the tactile sense through the touch of the tactile guidance face 51.

In FIGS. 6A and 6B, the layout pattern 52 is adapted to give information about relatively positioned layouts of the operational devices to be obtained when a horizontal portion and a vertical portion of the operation face, i.e., the customer service operating section 20 of the automatic transaction equipment is developed. For example, a card handling portion, a bankbook portion, a coin handling portion, a paper money handling portion and an operation displaying section are represented by patterns 53, 54, 55, 56 and 57, respectively. In the vicinity of each of the patterns are formed Braille dots 60 which give information about each of the operational devices.

Moreover, in the vicinity of each of the patterns described above is mounted a vibrator 62 driven by a piezo-electric device 61. Since the automatic transaction equipment is operated to vibrate the vibrator 62 selectively in accordance with operational steps, the user can understand by the tactile sense which part of the operational device should be operated. For example, when the user is going to insert a card into the card handling port, the user, by touching the vibrating vibrator 62 mounted at the pattern 53 indicating the card handling port, can know the relative position of the card handling port.

FIG. 7 is a top view of the guidance section 24 of the conventional automatic transaction equipment. On a tactile face 71 of the guidance section 24, i.e., the collective guidance plate 24, are displayed a guidance message 72, a message 73 showing the operation procedures, and messages 74 showing each operation procedure, all of which are written in Braille (in FIG. 7, though they are displayed in normal characters). Vibrators 75 having the same function as those mounted on the guidance section 23 are provided in a head position of the messages 74 showing each of the operation procedures. These vibrators 75, signaling the contents of the operation procedures, are adapted to correspond to the vibrators 62 mounted near the patterns on the guidance section 23 and each of the corresponding vibrators is vibrated, in order, depending on each step of the operations. A user with vision impairments can receive guidance on the procedures not only by the tactile sense but also by a voice from a speaker (not shown). The user performs operations including the insertion of the card or the bankbook, input of a personal identification number, input of money amounts for depositing or drawing cash, reception of the cash, card or bankbook or the like in accordance with the guidance for the transaction. In the automatic transaction equipment, the user's input of a personal identification number or money amounts is performed by using a ten-key pad displayed also in Braille.

As described above, the conventional automatic transaction equipment enables a user with vision impairments to get information about the shape and/or function of the operational devices by touching each pattern and Braille dots provided on the guidance section 23 or about the operational order contents of the message written in Braille dots or by touching the vibrators in the guidance section 24. However, it is necessary for the user with vision impairments to pass his/her hand over the whole portion of the customer service operating section 20 before the positions of the handling port for putting in coins or inserting paper money and for receiving them or of the handling port for inserting and/or receiving the bankbook or card can be found. That is, in the conventional automatic transaction equipment, it is possible for the user with vision impairments to get information about the relative position of each of the operational devices on the customer service operating section 20 but difficult to get information about the absolute position of each of the operational devices. Therefore, the conventional transaction equipment has problems in that it cannot be fully used with ease by the user with vision impairments and that it is of inferior operability. Moreover, it has another problem in that, since the structure of each of the handling ports and the position of portions displayed in Braille differ from manufacturer to manufacturer, the user with vision impairments has to confirm, in advance, the shape and/or the position of the operational device every time the transaction is carried out, thus imposing a burden on the user. It has still further problem in that, since the vibrator activated by the piezoelectric device is used to give information about each of the operational devices and/or operational procedures to the user, the structure of the equipment is complicated, thus making the equipment costly.

SUMMARY OF THE INVENTION

In view of the above, it is an object of the present invention to provide automatic service equipment capable of giving excellent operability to users with vision impairments. It is another object of the present invention to provide the automatic service equipment capable of giving not only excellent operability but also easy and simple handleability to users with vision impairments and cost effectiveness.

According to an aspect of the present invention, there is provided automatic service equipment for providing a specified service to a user including:

an operating section to perform operations to receive the service;

a tactile displaying section mounted leaving a space from the operating section to display information about operations at the operating section which is allowed to be identified by a tactile sense; and a guiding section extending from the tactile displaying section to the operating section to guide a user to the operating section by the user's tactile sense.

In the foregoing, a preferable mode is one wherein the operating section is provided with a voice guiding section to give guidance on operational procedures for the automatic service equipment by a voice.

Also, a preferable mode is one wherein two or more operating sections are provided as the operating section and the two or more operating sections are displayed collectively on a guidance plate mounted on the tactile displaying section so as to be identified by being touched by the user.

Also, a preferable mode is one wherein each of the guiding sections is extended from the guidance plate to each of the operating sections.

Also, a preferable mode is one wherein includes a front panel and wherein the guiding section is composed of a modified portion extending from the tactile displaying section to the operating section.

Also, a preferable mode is one wherein the modified portion is formed in a continuous form in a direction of its extension.

Also, a preferable mode is one wherein the modified portion is formed in an intermittent form in a direction of its extension.

Also, a preferable mode is one wherein the modified portion is composed of a convex portion.

Also, a preferable mode is one wherein the modified portion is composed of a concave portion.

Also, a preferable mode is one wherein the operating section includes a cash handling port having a shutter, a bankbook handling port to insert and eject a bankbook, a card handling port to insert and eject a card for transaction and an operation timing key and wherein opening of the shutter of the cash handling port and ejection of the bankbook from the bankbook handling port and of the card from the card handling port are performed by operations of the operation timing key depending on contents of the transaction.

Furthermore, a preferable mode is one wherein the voice guiding section is a handset having two or more operational buttons and a receiver and the operation timing key is attached as one of the operational buttons.

BRIEF DESCRIPTION OF THE DRAWINGS

The above and other objects, advantages and features of the present invention will be more apparent from the following description taken in conjunction with the accompanying drawings in which:

FIG. 6A is a top view of a guidance section of the conventional automatic transaction equipment and FIG. 6B is a cross-sectional view of the guidance section of FIG. 6A taken along the line b—b; and FIG. 7 is a top view of a guidance section of the conventional automatic transaction equipment.

DESCRIPTION OF THE PREFERRED EMBODIMENTS

Best modes of carrying out the present invention will be described in further detail using various embodiments with reference to the accompanying drawings.

First Embodiment

In a first embodiment of the present invention, automatic service equipment is provided in the form of automatic transaction equipment to be installed at a bank or a like.

Figure 1:
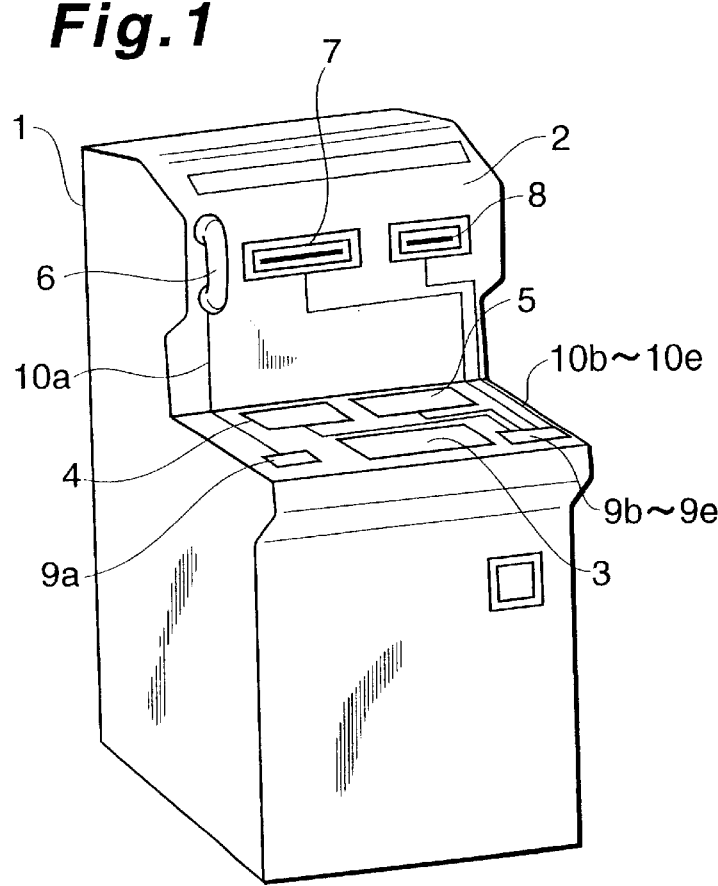
FIG. 1 is a perspective view of automatic transaction equipment according to a first embodiment of the present invention.
Figure 2:
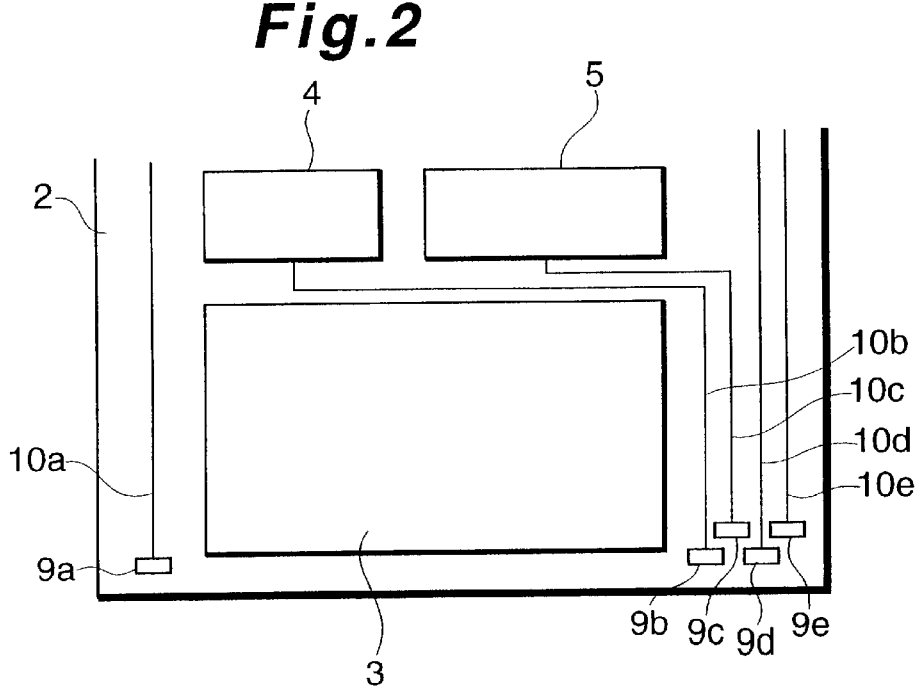
FIG. 2 is a top view of a horizontal portion of a front panel servicing as a customer operation section of the automatic transaction equipment according to the first embodiment of the present invention.

FIG. 1 is a perspective view of automatic transaction equipment according to the first embodiment of the present invention. FIG. 2 is a top view of a horizontal portion of a front panel which serves as a customer operation section of the automatic transaction equipment according to the first embodiment. As shown in FIG. 1, in a front upper portion of a cabinet 1 of the automatic transaction equipment are provided an approximately L-shaped customer operating section 2 composed of a horizontal portion and a vertical portion. On this side of the horizontal portion of the customer operating section 2 is mounted an operation displaying section 3 composed of a touch panel attached to a display device such as a liquid crystal display and at the back of the horizontal portion are arranged, in parallel, a coin handling port (cash handling port) 4 and a paper money handling port (cash handling port) 5, both having a shutter that can be opened or closed. At the vertical portion of the customer operating section 2 are attached, in order from the left side to right sides, a handset 6 having a ten-key pad and two or more functional keys, a bankbook handling port 7 to insert and eject the bankbook and a card handling port 8 to insert and eject a magnetic card. The handset 6 has a function of guiding the user with vision impairments in informing operational procedures of the automatic transaction equipment. By using the ten-key pad and functional keys attached to the handset 6, the user is allowed to input any numeral or a like into the automatic transaction equipment.

On this side of the horizontal part of the customer operating section 2, as displayed under magnification in FIG. 2, are provided operation displaying sections giving various information about procedures with the coin handling port 4, paper money handling port 5, handset 6, bankbook handling port 7 and card handling port 8, i.e., tactile displaying or information-presentation sections 9*a* to 9*e*. Characters written in Braille, representing, for example, "Handset," "Coin," "Paper money," "Bankbook" and "Card," are displayed or presented on the tactile displaying sections 9*a* to 9*e* and the user can discriminate which operational device is indicated by each of the tactile displaying sections 9*a* to 9*e* by touching any one of the tactile displaying sections 9*a* to 9*e*.

In the example shown in FIG. 2, the tactile displaying section 9*a* (giving information about the handset 6) is mounted on the left side of the operation displaying section 3 and the remaining tactile displaying sections 9*b* to 9*e* (giving information about the coin handling port 4, paper money handling port 5, bankbook handling port 7 and card handling port 8, respectively) are mounted in the right side of the operation displaying section 3. These tactile displaying sections 9*a* to 9*e* may be mounted collectively on the guidance section (collective guidance plate) 23 as shown in FIG. 6A so that the user with vision impairments can find with ease.

Between the tactile displaying sections 9*a* to 9*e* and the operational devices 4 to 8 are guides 10*a* to 10*e*, which extend from each of the tactile displaying sections to its corresponding operational device. Each of the guides 10*a* to 10*e* is composed of a convex portion formed on the front panel, which stretches on a continual basis in a direction of its extension. The user can easily reach any desired operational device by a tactile sense by tracing the guides 10*a* to 10*e* with his/her fingertip. The guides 10*a* to 10*e* may be formed not only in the convex shape but also in the concave shape. Moreover, they may be so formed that they stretch intermittently.

Figure 3:
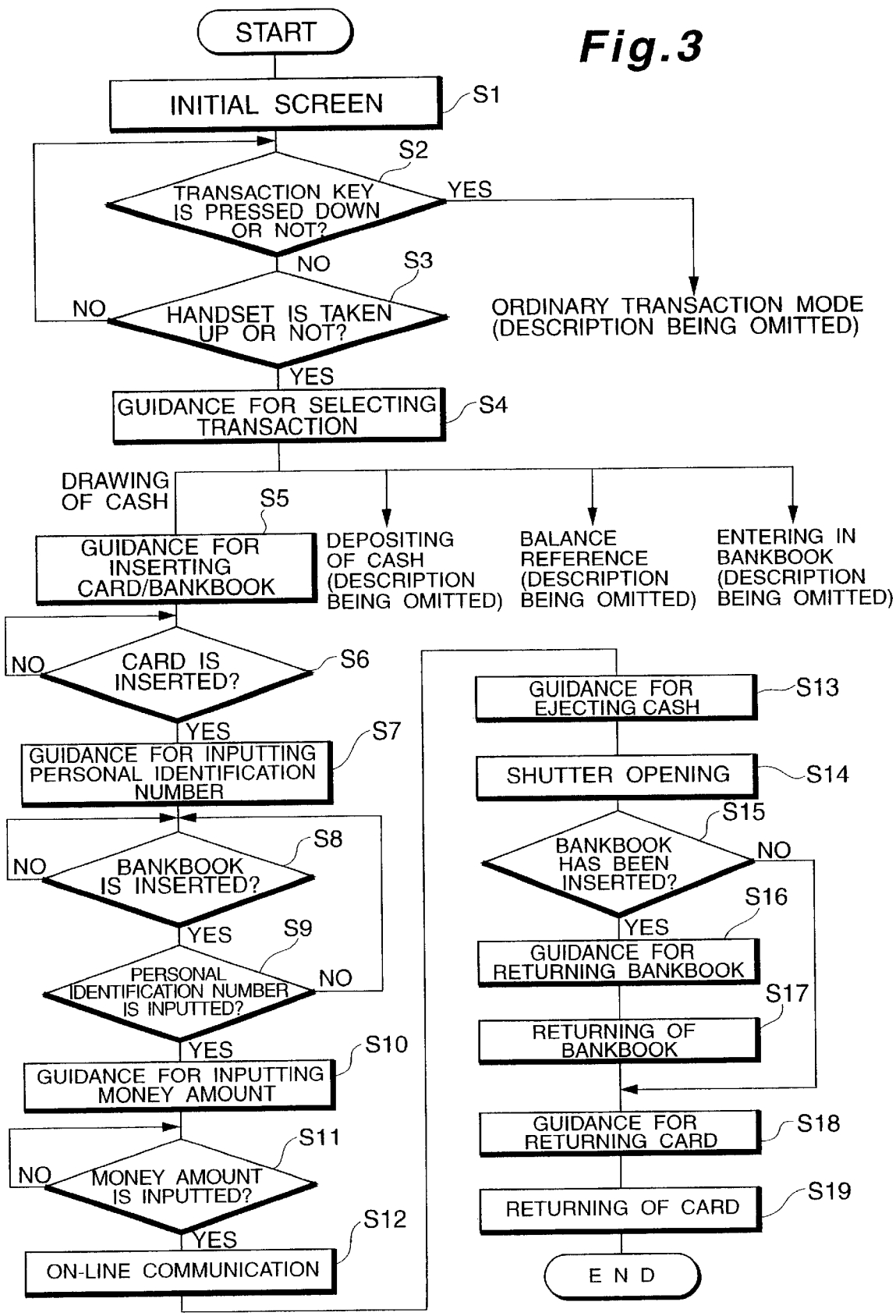
FIG. 3 is a flowchart showing operational procedures for the automatic transaction equipment according to the first embodiment of the present invention.

FIG. 3 is a flowchart showing operational procedures for the automatic transaction equipment according to the first embodiment. The operational procedures to be employed for a user with vision impairments will be hereinafter described by referring to the flowchart shown in FIG. 3. In FIG. 3, the symbol "S" represents a step of the procedures. Though operations of the automatic transaction equipment are controlled by a control section (not shown), in the description below, the explanation thereof is omitted.

In ordinary operation of the automatic transaction equipment by a user without vision impairments, when a specified initial screen appears on the operation displaying section 3 and displays types of transactions, prompting the user to select one of them (Step S1), the user selects the transaction that is desired by pressing down the touch panel attached to the operation displaying sections 3 (Step S2). On the other hand, in the case of a user with vision impairments (hereinafter referred to simply as "the user"), the handset 6 is used to specify the contents of the transactions. The user can receive the information provided by the handset 6 by putting his/her left hand on the horizontal portion of the customer operating section 2 and by touching the tactile displaying section 9*a*, which has "Handset" written in Braille. The user, after having identified the tactile displaying section 9*a* by a tactile sense, can reach the handset 6 smoothly without groping, simply by tracing the guide 10*a* extending from the tactile displaying section 9*a* with his/her fingertip. Moreover, the equipment may be so constructed that a spoken guidance, telling the user to put his/her left hand on the horizontal portion of the customer operating section 2 and to take up the handset 6, is outputted from a speaker (not shown) at this point. When the user takes up the handset 6 (Step S3) and the speaker in the handset 6 is applied to an ear, a voice to prompt the user to select a type of the transaction is heard (Step S4). The user selects the type of the transaction by operating the ten-key pad of the handset 6 in accordance with the voice guidance.

The transaction includes depositing and drawing of cash, balance reference, entering in the bankbook or a like. In the example shown in FIG. 3, the transaction of drawing cash is selected by pressing a specified number down. When the transaction of drawing cash is selected, voice guidance prompting the user to insert a magnetic card (such as a specified cash card) is heard from the handset 6 (Step S5). At this point, the user has to know the position of the card handling port 8 so that he/she can insert the card in accordance with the voice guidance. To determine the position of the handling port, the user puts his/her right hand on the horizontal portion of the customer operating section 2 and finds the tactile displaying section 9*e*, which has "Card" written in Braille. The user, by tracing the guide 10 *e* with his/her fingertip after selecting the tactile displaying section 9*e*, can reach the card handling port 8 smoothly and without groping and can insert the magnetic card into the card handling port 8.

When the insertion of the magnetic card is detected (Step S6) by a sensor (not shown), the user is prompted to input a personal identification number required for the transaction through the automatic transaction equipment, and a voice guidance message saying "Insert a bankbook if you have one" is heard from the handset 6 (Step S7). The user, when he or she has a bankbook, inserts it into the bankbook handling port 7 (Step S8) and inputs the personal identification number through the ten-key pad attached to the handset 6. Moreover, the user, when he or she does not have a bankbook, after having received the voice guidance (Step S7), inputs the personal identification number through the ten-key pad of the handset 6 (Step S9).

The user, in order to insert the bankbook into the bankbook handling port 7, first finds the tactile displaying section 9*d* (having "Bankbook" written in Braille) and, by tracing the guide 10*d* extending from the tactile displaying section 9*d*, can reach the bankbook handling port 7 easily and without groping. After the input of the personal identification number, a voice guidance message that prompts the user to input the amount of money to be drawn is heard from the handset 6 (Step S10). When the user inputs the money amount using the ten-key pad of the handset 6 in accordance with the voice guidance (Step S11), the automatic transaction equipment communicates on-line with a host computer (not shown) installed at a center of a financial institution adapted to manage the equipment (Step S12). When the automatic transaction equipment receives a notification that indicates permission for the transaction from the host computer via the on-line communication, a voice guidance message notifying the user of the ejection of paper money from the paper money handling port 5 is heard from the handset 6 (Step S13) and a shutter of the paper money handling port 5 is opened (Step S14). The user then finds the tactile displaying section 9c (having "Paper money" written in Braille) in accordance with the voice guidance and, by tracing the guide 10c therefrom with his/her fingertip, can easily reach the paper money handling port 5. Then, the user takes out paper money accumulated at the paper money handling port 5. When coins have to be ejected from the coin handling port 4, the same procedures as for drawing paper money are to be taken. Then, the automatic transaction equipment judges whether a bankbook was inserted or not at Step S8 and, if a bankbook has been inserted, a voice guidance message notifying the user of the return of the bankbook is heard from the handset 6 (Step S16) and the bankbook is ejected from the bankbook handling port 7. The user finds the tactile displaying section 9d (having "Bankbook" written in Braille) and traces the guide 10d extending from the tactile displaying section 9d to reach the bankbook handling port 7, from which the user can pull the bankbook smoothly (Step S17).

Then, a voice guidance message notifying the user of the return of the magnetic card is heard from the handset 6 (Step S18) and the magnetic card is ejected from the card handling port 8. Moreover, if a bankbook has not been inserted, after the cash has been ejected (Step S14), a voice guidance message informing the user of the return of the magnetic card is heard (Step S18). The user can collect the magnetic card smoothly from the card handling port 8 by finding the tactile displaying section 9e (having "Card" written in Braille) and tracing the guide 10e extending from the tactile displaying section 9e to reach the card handling port 8, and by pulling the card from the port 8 (Step S19). Furthermore, in the automatic transaction equipment, the user can perform the transactions of depositing cash, balance reference, or entering information in the bankbook in the same manner as in the case of drawing cash.

According to the first embodiment, the automatic transaction equipment is provided with the tactile displaying sections 9b, 9c, 9d and 9e indicating, in Braille, the operational devices including, respectively, the coin handling port 4, paper money handling port 5, bankbook handling port 7 and card handling port 8 and having guides 10b, 10c, 10d and 10e adapted to guide the user for each of the operational devices.

As described above, according to the first embodiment of the present invention, a user with vision impairments, by selecting any tactile displaying section corresponding to the required operational device out of the tactile displaying sections 10b to 10e in accordance with the voice guidance from the handset 6 and by tracing the guide extending from the selected tactile displaying section, can easily reach the targeted operational device. Since the user can thus find the targeted operational device with ease without the need to pass his/her hand over the whole of the customer operating section, unlike in the case of the conventional equipment, the operability of the automatic transaction equipment for the user with vision impairments can be improved greatly.

Even if the structure of each of the handling ports and the position of portions displayed in Braille differs from manufacturer to manufacturer, since the user can reach the targeted operational device smoothly by tracing the guide with his/her fingertip, it is not necessary for a user with vision impairments to confirm, in advance, the shape and/or the position of the operational device every time a transaction is carried out, thus reducing the burden imposed on the user.

According to the first embodiment described above, the user can find easily an operational device not by mounting a complicated device such as the vibrator to be activated by a piezo-electric device, as employed in the conventional equipment, but by forming a guide having simple structures, which thus serves to reduce the costs related to the automatic transaction equipment to be operated by the user with vision impairments.

Second Embodiment

Figure 4:
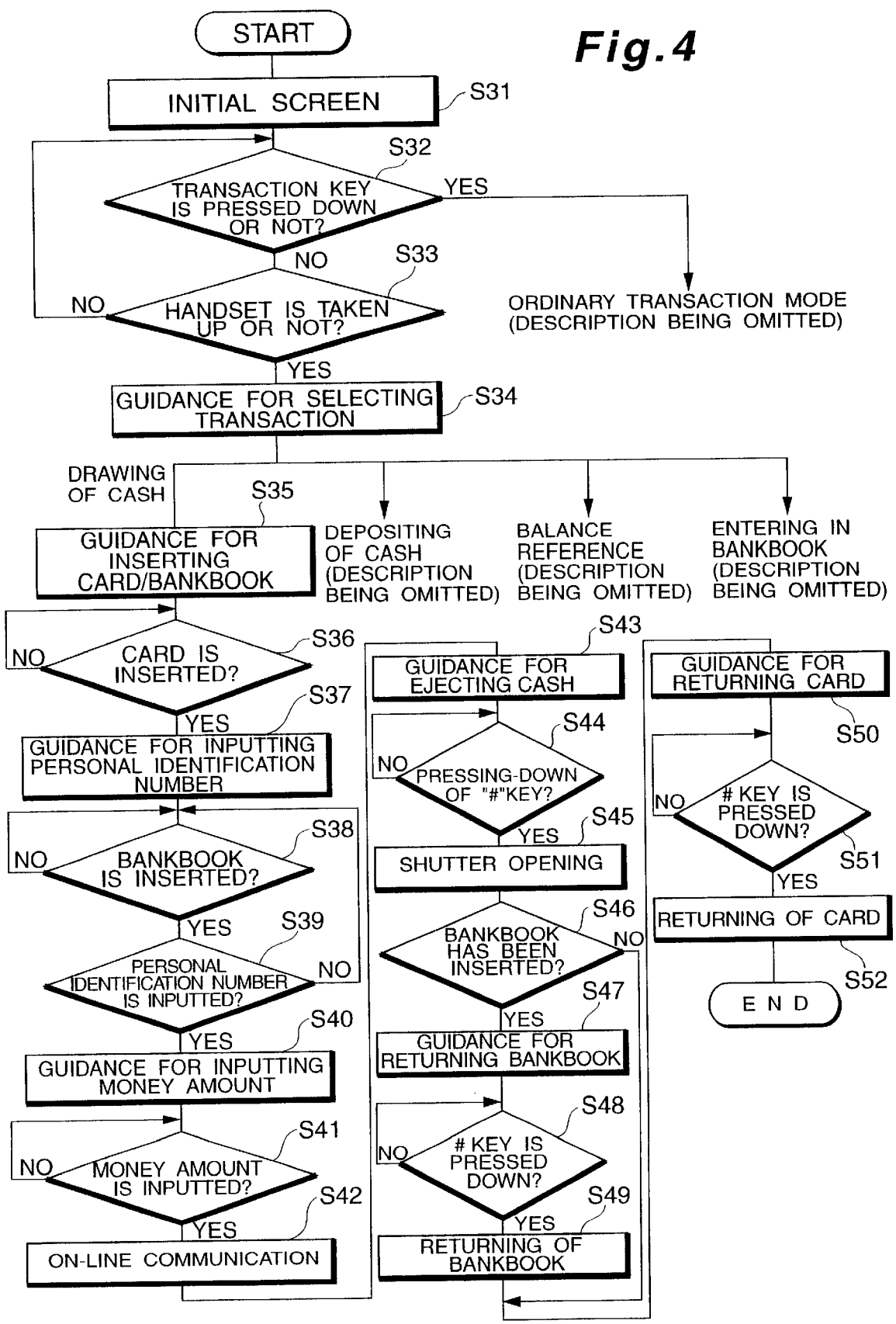
FIG. 4 is a flowchart showing operational procedures for the automatic transaction equipment according to a second embodiment of the present invention.
Figure 5:
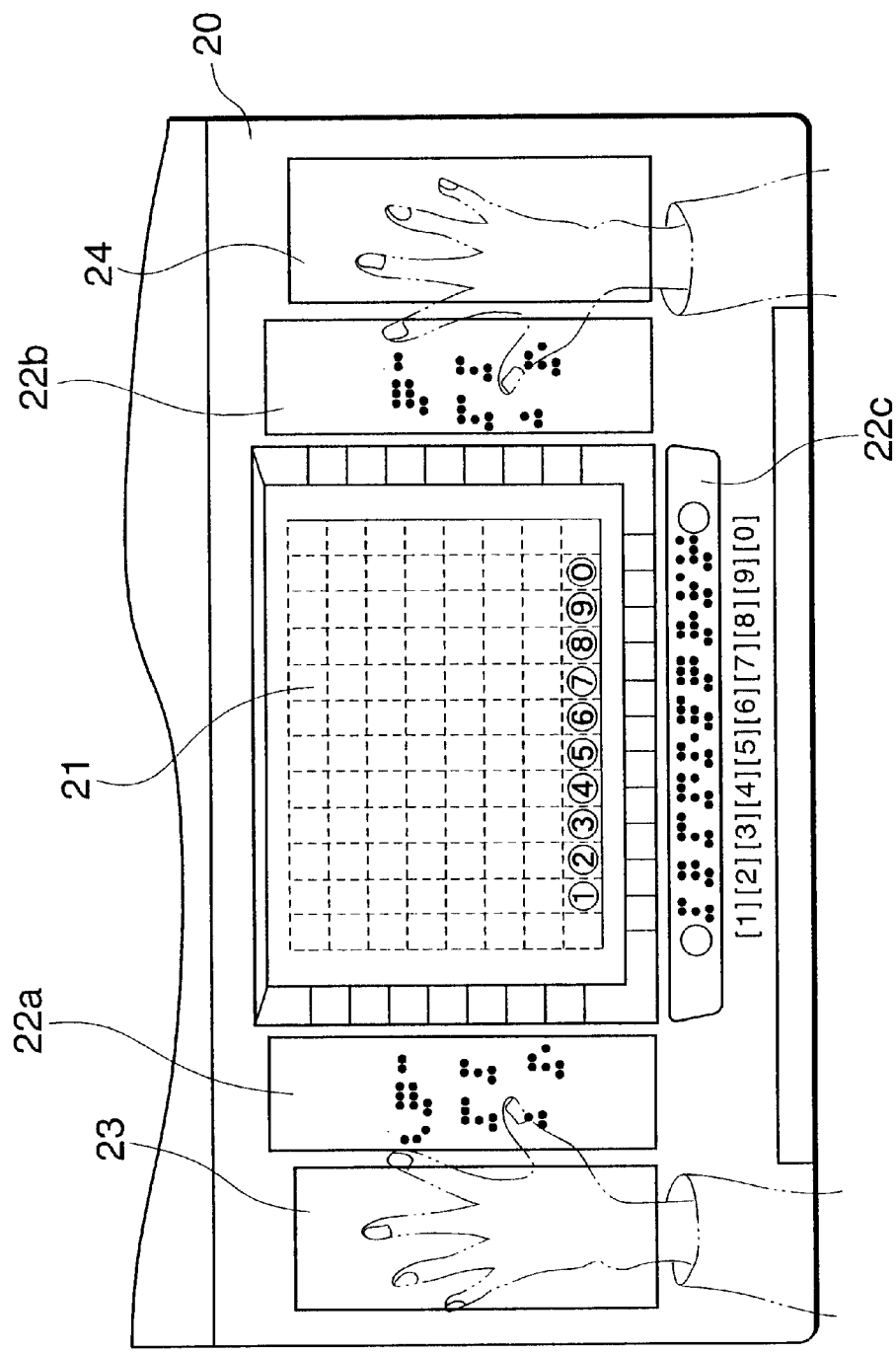
FIG. 5 is a top view of a horizontal portion of a customer service operating section in conventional automatic transaction equipment.

In the second embodiment of the present invention, the automatic service equipment is provided in the form of automatic transaction equipment as in the case of the first embodiment. In the automatic transaction equipment of the second embodiment, an operation timing key to allow users themselves to control the timing for taking out paper money and collecting the magnetic card is provided additionally. The operation timing key is attached to the handset 6 provided in the first embodiment and is shown as a "#" key. The configuration of the automatic transaction equipment of the second embodiment is the same as that in the first embodiment except for the operation timing key. FIG. 4 is a flowchart showing operational procedures for the automatic transaction equipment according to the second embodiment of the present invention. Operational procedures for a transaction by a user with vision impairments will be described hereinafter by referring to the flowchart.

In ordinary operation of the automatic transaction equipment by a user without vision impairments, when a specified initial screen appears on the operation displaying section 3 and displays types of transactions, prompting the user to select one of them (Step S31), the user selects the transaction that is desired by pressing down the touch panel attached to the operation displaying sections 3 (Step S32). On the other hand, in the case of a user with vision impairments (hereinafter referred to simply as "the user"), the handset 6 is used to specify the type of the transactions. The user can receive the information provided by the handset 6 by putting his/her left hand on the horizontal portion of the customer operating section 2 and by touching the tactile displaying section 9a, which has "Handset" written in Braille. The user, after having identified the tactile displaying section 9a by a tactile sense, can reach the handset 6 smoothly without groping, by tracing the guide 10a extending from the tactile displaying section 9a with his/her fingertip. Moreover, the equipment may be so constructed that spoken guidance, telling the user in putting his/her left hand on the horizontal portion of the customer operating section 2 and to take up the handset 6, is outputted from a speaker (not shown) at this point. When the user takes up the handset 6 (Step S33) and the speaker in the handset 6 is applied to an ear, a voice to prompt the user to select the transaction is heard (Step S34). The user selects any type of transaction by operating the ten-key pad of the handset 6 in accordance with the voice guidance.

The transaction includes depositing and drawing of cash, balance reference, entering in the bankbook or a like. In the example shown in FIG. 4, the transaction of drawing cash is selected by pressing a specified number down. When the transaction of drawing cash is selected, voice guidance prompting the user to insert a magnetic card (such as a specified cash card) is heard from the handset 6 (Step S35). At this point, the user has to know the position of the card handling port 8 so that he/she can insert the card in accordance with the voice guidance. To determine the position of the handling port, the user puts his/her right hand on the horizontal portion of the customer operating section 2 and finds the tactile displaying section 9e, which has "Card" written in Braille. The user, by tracing the guide 10e with his/her fingertip after selecting the tactile displaying section 9e, can reach the card handling port 8 smoothly and without groping and can insert the magnetic card into the card handling port 8.

When the insertion of the magnetic card is detected (Step S36) by a sensor (not shown), the user is prompted to input a personal identification number required for the transaction through the automatic transaction equipment, and a voice guidance message saying "Insert a bankbook if you have one" is heard from the handset 6 (Step S37). The user, when he or she has a bankbook, inserts it into the bankbook handling port 7 (Step S38) and inputs the personal identification number through the ten-key pad attached to the handset 6. Moreover, the user, when he or she does not have a bankbook, after having received the voice guidance (Step S37), inputs the personal identification number through the ten-key pad of the handset 6 (Step S39).

The user, in order to insert the bankbook into the bankbook handling port 7, first finds the tactile displaying section 9d (having "Bankbook" written in Braille and, by tracing the guide 10d extending from the tactile displaying section 9d, can reach the bankbook handling port 7 promptly and without groping. After the input of the personal identification number, a voice guidance message that prompts the user to input the amount of money to be drawn is heard from the handset 6 (Step S40). When the user inputs the money amount through the ten-key pad of the handset 6 in accordance with the voice guidance (Step S41), the automatic transaction equipment communicates on-line with a host computer (not shown) installed at a center of a financial institution adapted to manage the equipment (Step 42). When the automatic transaction equipment receives a notification that indicates permission for the transaction from the host computer via the on-line communication, prior to ejection of paper money from the paper money handling port 5, a voice guidance message prompting the user to depress the "#" key (being an operation timing key to allow a shutter of the paper money handling port 5 to be opened and the paper money to be taken out) is heard from the handset 6 (Step S34). The user then finds the tactile displaying section 9c (having "Paper money" written in Braille) in accordance with the voice guidance and, by tracing the guide 10c therefrom with his/her fingertip, can easily reach the paper money handling port 5 to take out the paper money. The user, after confirming the position of the paper handling port 5, can open the shutter of the paper money handling port 5 (Step S45) by pressing down the "#" key of the handset 6 in accordance with the voice guidance (Step S44) and can take out the paper money accumulated in the paper money handling port 5. Moreover, if the ejection of coins from the coin handling port 4 is required, the same procedures as taken for the ejection of the paper money are executed. Then, whether a bankbook was inserted or not at Step S38 is judged (Step S46) and, if a bankbook has been inserted, a voice guidance message prompting the user to depress the "#" key (which is the operation timing key by which the user notifies the automatic transaction equipment of the timing of ejecting the bankbook) is heard from the handset 6 (Step S47).

The user, to collect the bankbook, finds the tactile displaying section 9d (having "Bankbook" written in Braille) and, by tracing the guide 10d extending from the tactile displaying section 9a, can easily reach the bankbook handling port 7. The user, after having confirmed the position of the bankbook handling port 7, by pressing down the "#" key attached to the handset 6 in accordance with the voice guidance message (Step S48), can collect the bankbook ejected from the bankbook handling port 7 (Step S49). Then, a voice guidance message prompting the user to depress the "#" key (which is the operation timing key used to notify the automatic transaction equipment of the timing of ejecting the magnetic card) is heard from the handset 6 (Step S50). The user finds the tactile displaying section 9e (having "Card" written in Braille) and, by tracing the guide 10e extending from the tactile displaying section 9e with his/her fingertip, can easily reach the card handling port 8. The user, after having confirmed the position of the card handling port 8, by pressing the "#" key attached to the handset 6 down in accordance with the voice guidance message (Step S51), can collect the magnetic card ejected from the card handling port 8 (Step S52). Moreover, to perform the transaction of depositing cash, balance reference and entering in the bankbook or the like, the same procedures as employed for drawing cash are used with the automatic transaction equipment.

As described above, in the automatic transaction equipment of the second embodiment, in which an operation timing key is added to that of the first embodiment, the same effects as in the first embodiment can be obtained and, in addition, the ejection of cash and the bankbook can be made with operating timing decided by the users themselves. This allows a user with vision impairments to operate the automatic transaction equipment without being confused and with sufficient lead time, which thus serves to improve the operability of the automatic transaction equipment.

As described above, according to the present invention, since a user with vision impairments can easily reach any targeted operational device by tracing the guides mounted corresponding to two or more operational devices and extending from the tactile displaying sections to the operational devices, the user can find the targeted operational device without the need to pass his/her hand over the whole of the customer operating section and without groping, thus providing the user with vision impairments with the improved operability and easy handleability of the automatic service equipment.

Moreover, according to the present invention, even if the structure of each of the operational devices differ from manufacturer to manufacturer, since the user can easily reach the targeted operational device by tracing the guide with his/her fingertip, it is not necessary for a user with vision impairments to confirm, in advance, the shape and/or the position of the operational devices every time a transaction is carried out. This reduces the burden on the user.

Furthermore, according to the present invention, since the user can easily find an operational device, not by using a complicated device such as a vibrator activated by a piezoelectric device but by forming a guide having simple structures, the costs related to the automatic service equipment can be reduced.

It is apparent that the present invention is not limited to the above embodiments but may be changed and modified without departing from the scope and spirit of the invention. For example, in the above embodiments, the automatic transaction equipment is shown as automatic service equipment, however, the present invention can be also applied to automatic service equipment such as automatic issuing equipment or automatic information retrieving equipment. Moreover, in the above embodiments, the handset 6 is used as the voice guiding section for the user with vision impairments, however, a well-known earphone jack may be used, to which an earphone can be inserted to provide the voice guidance. In this case, the ten-key pad to be used for inputting the personal identification number or the like may be mounted in the vicinity of the operation displaying section 2 so that the user can operate the ten-key pad in accordance with the voice guidance given through the earphone.

Also, in the above embodiments, the information about the operational devices in the tactile displaying or information-presentation sections 9a to 9e is displayed in Braille, however, symbols indicated by convex and/or concave portions that can function instead of the Braille dots or a combination of such symbols with Braille dots may be employed.

In the above embodiment, the tactile displaying (i.e., information-presentation) sections 9a to 9e are mounted on this side of the horizontal part of the customer operating section 2, however, these sections may be mounted at other positions. The guides 10a to 10e may be mounted at other positions than shown in the drawings.

Furthermore, in the operations of the handling ports 4, 5, 7 and 8, the present invention is not limited to the order of operational procedures shown in the above embodiments. The order of these procedures may be changed as necessary. In the second embodiment, the "#" key is used as the operation timing key, however, other keys may be employed as well.

What is claimed is:

1. Automatic service equipment for providing a specified service to a user having a tactile sense, comprising:
    two or more operating sections for performing operations to render said service;
    tactile information-presentation sections, each of which is mounted on a portion of the automatic service equipment where the user can reach it at once, leaving a space from a corresponding one of said operating sections, to present information about operations at said corresponding operating section via the user's tactile sense; and
    guiding sections extending from said tactile information-presentation sections to said corresponding operating sections to guide the user's hand to each of said operating sections by the user's tactile sense,
    wherein the user can read information about the existence of each operating section at once by touching the corresponding tactile information-presentation section, and reach a desired operating section by tracing the guiding section with the user's fingertip.

2. The automatic service equipment according to claim 1, wherein said operating sections include a voice guiding section to give guidance on operational procedures for said automatic service equipment by at least one voice message,
    wherein, in addition to reading information about the existence of the voice guiding section at once by touching the corresponding tactile information-presentation section and reaching the voice operating section by tracing the guiding section with the user's fingertip, the user hears a voice message to select a specified service and perform a specified operation to render said service.

3. The automatic service equipment according to claim 2, wherein said tactile information-presentation section corresponding to said voice guiding section is provided on the left side of a guidance plate and the other tactile information-presentation sections are provided on the right side of the guidance plate in front of the user.

4. The automatic service equipment according to claim 1, wherein said guiding sections comprise tactile paths extending from said guidance plate to each of said operating sections.

5. The automatic service equipment according to claim 1, further comprising a front panel, wherein each of said guiding sections comprises a modified portion of said front panel extending from one of said tactile information-presentations sections to said corresponding operating section.

6. The automatic service equipment according to claim 5, wherein each of said modified portions provides a continuous path.

7. The automatic service equipment according to claim 5, wherein each of said modified portions provides an intermittent path.

8. The automatic service equipment according to claim 5, wherein each of said modified portions has a convex configuration.

9. The automatic service equipment according to claim 5, wherein each of said modified portions has a concave configuration.

10. The automatic service equipment according to claim 2, wherein said operating sections include a cash handling port having a shutter, a bankbook handling port to insert and eject a bankbook, a card handling port to insert and eject a card for transactions and an operation timing key, and wherein opening of said shutter of said cash handling port and ejection of the bankbook from said bankbook handling port and of said card from said card handling port are performed by operations of said operation timing key depending on the nature of the transaction.

11. The automatic service equipment according to claim 10, wherein said voice guiding section comprises a handset having two or more operational buttons and a receiver and said operation timing key is attached as one of said operational buttons.

12. Automatic service equipment for providing banking services to a user who has a tactile sense and who possesses a transaction card, comprising:
    first, second, and third ports, one of the ports being a card-handling port to receive the transaction card and another of the ports being a cash-handling port to dispense cash;
    first, second, and third Braille messages that are mounted on a portion of the automatic service equipment where the user can reach them at once, and that are spaced apart from the first, second, and third ports;
    a first tactile path extending from the first Braille message, guiding the user's hand to the first port by the user's tactile sense;
    a second tactile path extending from the second Braille message, guiding the user's hand to the second port by the user's tactile sense; and
    a third tactile path extending from the third Braille message, guiding the user's hand to the third port by the user's tactile sense,
    wherein the user can read information about the existence of each port at once by touching the corresponding Braille message, and reach any of the ports by tracing the respective path with the user's fingertip.

13. The automatic service equipment according to claim 12, further comprising a handset to deliver audible instructions to the user, a fourth Braille message associated with the handset, the fourth Braille message being mounted on said portion of the automatic service equipment where the user can reach it at once, and a fourth tactile path extending from the fourth Braille message, guiding the user's hand to the handset by the user's tactile sense, wherein the user can:
- read information about the existence of the handset at once by touching the fourth Braille message, and reach the handset by tracing the fourth tactile path with the user's fingertip,
- hear a voice message to select a specified banking service and perform a specified operation to obtain said banking service, and
- read information about the existence of the first, second, and third ports by touching the corresponding Braille message, and reach the first, second, or third port by tracing the respective path with the user's fingertip.

14. The automatic service equipment of claim 12, wherein the first, second, and third Braille messages are disposed in the localized area that is substantially smaller in size than an area encompassing the first, second, and third ports.

15. The automatic service equipment according to claim 13, wherein said first, second, and third Braille messages are provided on the right side of a guidance plate and said fourth Braille message is provided on the left side of the guidance plate in front of the user.

* * * * *